H. OLERICH.
TRACTOR.
APPLICATION FILED MAR. 28, 1917.

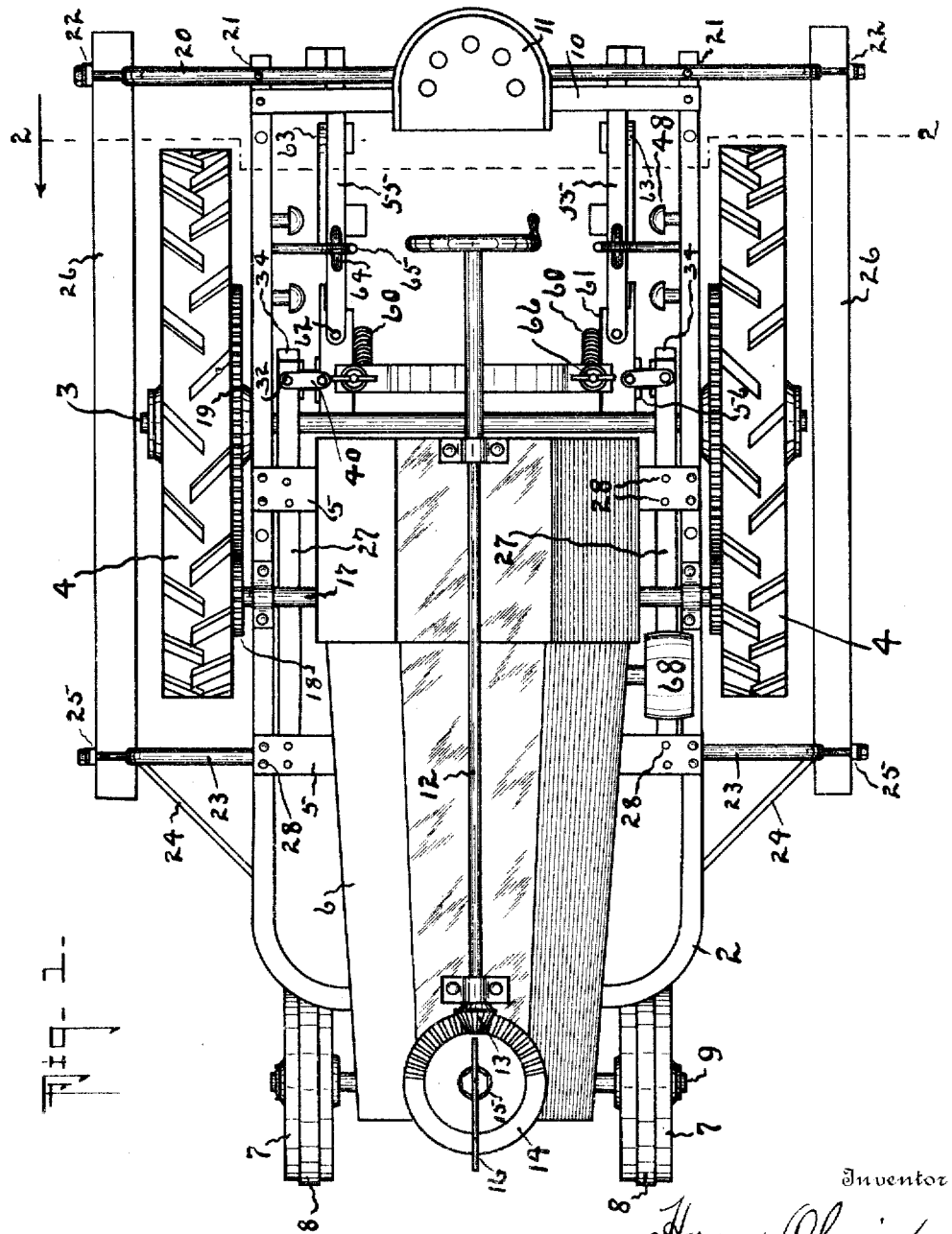

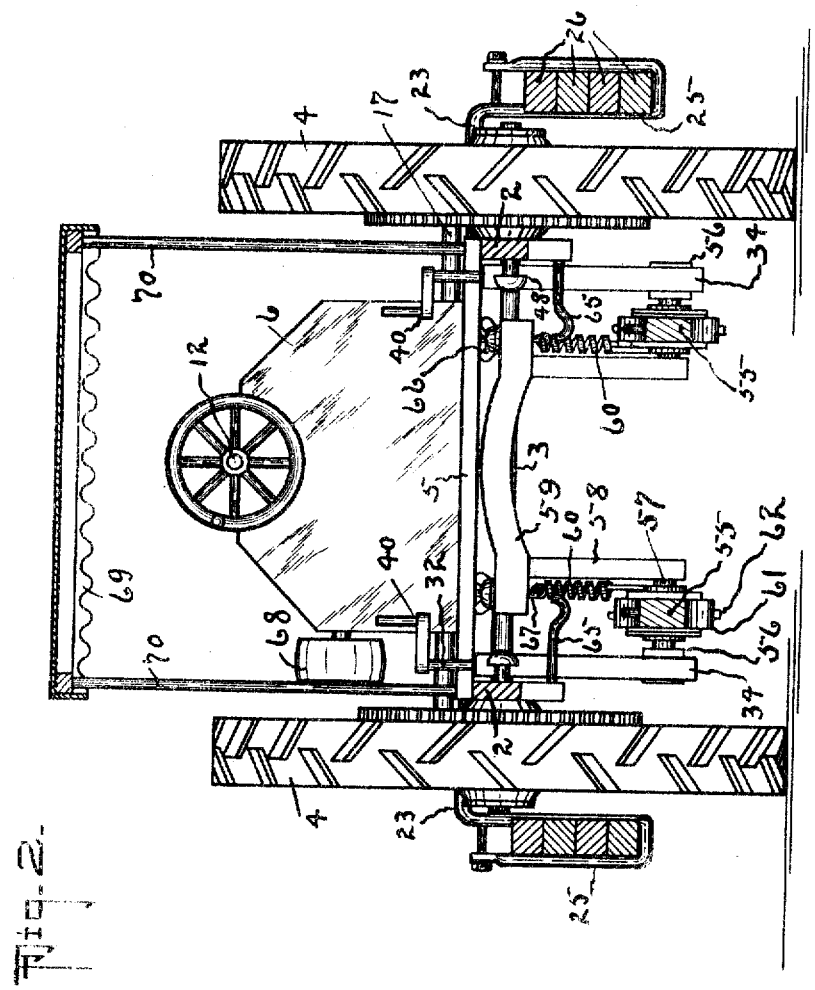

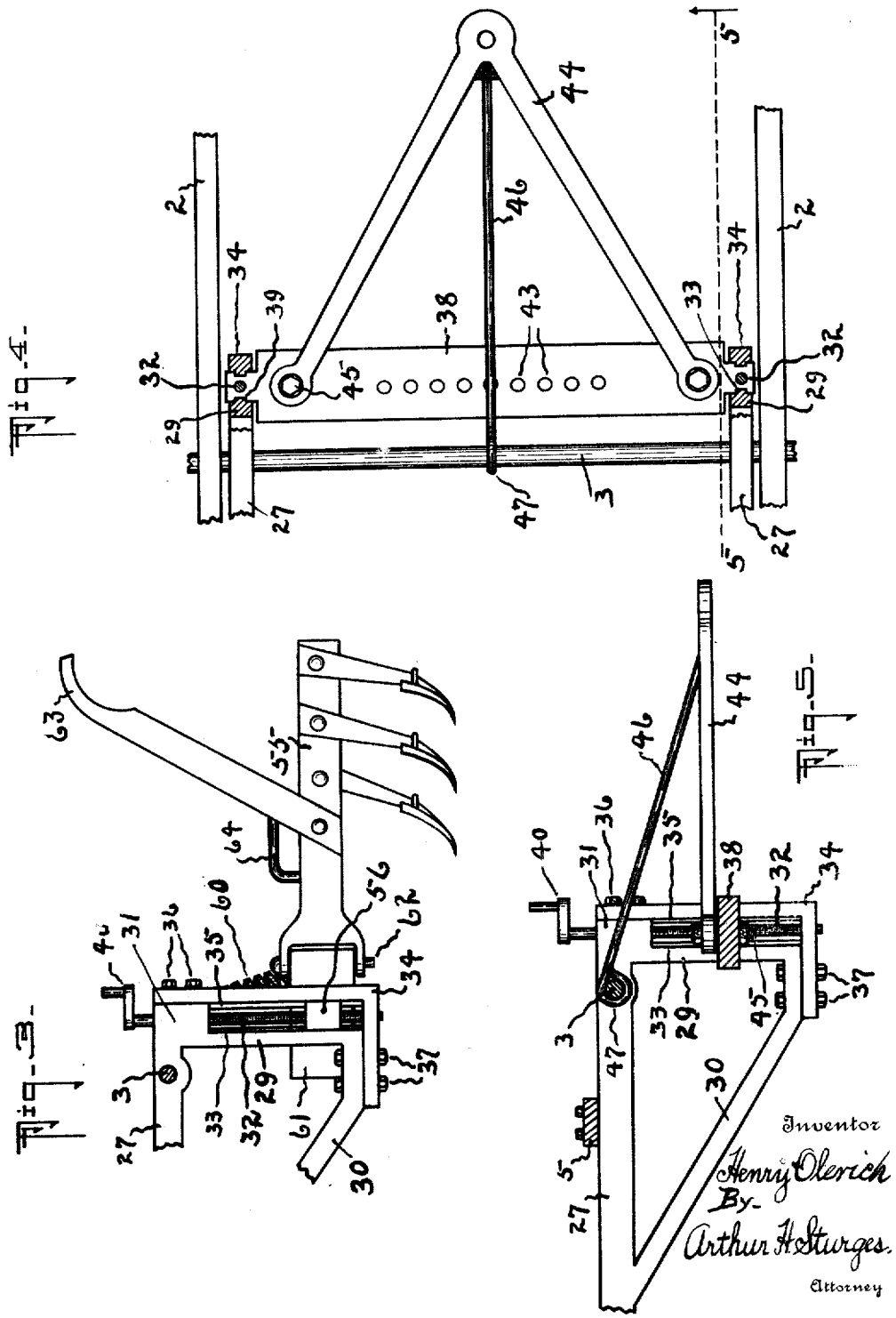

1,273,652.

Patented July 23, 1918.
4 SHEETS—SHEET 4.

Fig. 7.

Fig. 6.

Inventor
Henry Olerich
Arthur H. Sturges.
By
Attorney

UNITED STATES PATENT OFFICE.

HENRY OLERICH, OF OMAHA, NEBRASKA, ASSIGNOR OF ONE-FIFTEENTH TO VIOLA OLERICH, OF OMAHA, NEBRASKA, AND JOSEPH OLERICH, H. A. OLERICH, HARMON OLERICH, VICTOR OLERICH, ROBERT OLERICH, MARTHA RICKE, HENRY RICKE, WILLIAM RICKE, BEN RICKE, ANTON RICKE, FRANK BRINKER, EARL OLERICH, AND FRANK VAN ERDEWYK, ALL OF BREDA, IOWA.

TRACTOR.

1,273,652.  Specification of Letters Patent.  Patented July 23, 1918.

Application filed March 28, 1917. Serial No. 158,089.

*To all whom it may concern:*

Be it known that I, HENRY OLERICH, a citizen of the United States, residing at Omaha, in the county of Douglas and State of Nebraska, have invented certain new and useful Improvements in Tractors, of which the following is a specification.

This invention relates to an improvement in tractors, and has for its object, broadly to provide a tractor adapted for use in plowing, cultivating or drawing loads, to dispense with animal power for farm work or general use.

Another object is to provide a tractor which will consist of few and simple parts so that it will be durable and may be economically manufactured.

Another object is to provide means for conveniently increasing or decreasing the weight of the tractor. Other objects in view relate to means which may be conveniently operated by the driver for controlling plows and cultivators and adjusting the mounting of their beams to a required height.

With the foregoing objects in view and others to be mentioned hereinafter, the invention presents a novel construction, combination and arrangement of parts as described herein and claimed, and as illustrated in the accompanying drawing wherein,—

Figure 1 is a plan view of the tractor, a pair of cultivators being attached thereto. Fig. 2 is a rear end view of the tractor on line 2—2 of Fig. 1, the front wheels and their axle being omitted.

Fig. 3 is a view in side elevation of a vertical adjusting-screw and its bearings for adjusting the height of a cultivator or plow beam. Fig. 4 is a plan view of a coupling-plate and its bearings, said bearings and the adjusting-screws being in section. Fig. 5 is a view in transverse section on line 5—5 of Fig. 4. Fig. 6 is a view in side elevation of the adjusting screw, the coupling plate being in transverse section on line 6—6 of Fig. 7. Fig. 7 is a plan view similar to the view shown in Fig. 4, showing a pair of plow-beams mounted upon the coupling-plate.

I provide a vehicle frame 2 of substantially U-shape which provides bearings for the main axle 3 of the tractor wheels 4, the frame being provided with a pair of cross-strips 5 for a mounting thereon of an engine 6. Numeral 7 indicates a pair of guide-wheels provided with peripheral ridges 8, the axle 9 therefor having suitable bearings (not shown) below and at the front of the frame. The frame is also provided with a cross-strip 10 upon which is mounted a driver's seat 11; and steering of the tractor is accomplished by means of the shaft 12 provided at its front end with a miter gear 13 engaging the disk-wheel 14 which operates a vertical shaft 15 for causing the required swinging movements of the axle 9 for steering. Numeral 16 indicates an index which may be visible by the driver as an aid in guiding the tractor, said index being mounted upon the upper end of the shaft 15.

The engine shaft is indicated at 17, said shaft having suitable bearings and provided at its ends with pinions 18 in engagement with the gear-wheels 19, the latter being mounted rigid with the tractor wheels, and as thus described the tractor may be under convenient control and may be moved on comparatively short curves.

In order that the tractor may be used for drawing heavy loads I provide a pair of weight-holders, consisting in part, of the transversely disposed bar 20 supported in recesses 21 formed in the upper side and near the rear ends of the frame, and secured thereto, its outer ends being provided with loops 22, the pair of transversely disposed arms 23 also being employed, each having its inner end suitably mounted in the frame and provided with a brace 24, the outer ends of said arms 23 preferably being bent to a loop form 25 conforming to the loops 22. Numeral 26 indicate elongated weights which may be deposited in the loops, the latter being disposed in a plane outwardly of, equi distant from and below the rear axle, so that the center of gravity will be disposed comparatively low, and that the wheels will suitably engage the ground.

In order that the tractor may be used for a variety of purposes, means are provided for attaching plows, cultivators or other implements or objects to be drawn, the object being to provide a substitute for animal power particularly useful to farmers.

I provide for this purpose an underframe consisting of a pair of sections, each preferably, being a casting, and including a horizontal arm or bar 27 which is secured by suitable keepers 28 to the cross-strips 5 of the frame, the remaining part of each section consisting of a vertical bar 29 which extends downwardly from the rear end of the bar 27, and the inclined brace 30 which connects the lower end of the last named bar with the bar 27, a boss or head-piece 31 being provided at the junction of the bars 27 and 29 for a mounting of the upper, smooth part of an adjusting screw 32, the inner side of each bar 29 being provided with a ridge 33.

The sections thus described provide a very strong construction for all stresses directed longitudinally of the vehicle by objects to be drawn, an L-shaped bar 34 being provided for each section, and having a ridge 35 formed on its inner side, and each bar 34 being removably secured at its upper end to a head-piece 31 by keepers 36, its lower end being removably secured by keepers 37 to a bar 30.

At 38 is indicated a coupling-plate, its ends operating as bearing-members since, as best shown in Figs. 4 and 7, they have threaded apertures for engaging the screws 32 and are provided with grooves 39 for receiving the ridges 33 and 35 mentioned, and it will be understood that by use of cranks 40 the coupling-plate may be elevated or lowered to a required height for a mounting of a clevis 41 for the plow-beams 42, numerous apertures 43 being provided for connecting the clevis or other parts thereto of objects to be drawn and which may require different altitudes.

Numeral 44 indicates a tongue-member or hitching attachment for the coupling-plate. It is substantially of V-shape, its arms, at their terminals being secured to the coupling-plate by bolts 45, said attachment also being provided with a hanger 46 provided with a hook 47 adapted to engage the axle 3, and member 44 may be used for a connection with various objects to be drawn.

Numeral 48 indicate lugs or pins arranged in pairs, these being secured upon the inner sides of the side-bars of the frame for a mounting thereon of the yoke 49 of a shaft 50 which supports a sleeve 51, said sleeve being provided with pulleys 52 which carry chains 53 for shifting the plow beams when elevating or lowering the plows, a hand-lever 54 being provided within convenient reach of the driver's seat for this operation.

As described, it will be seen that the shaft 50 and parts connected therewith may be readily removed or placed in position, and when the tractor is used in connection with a pair of cultivators, the beams of which are indicated at 55, the coupling-bar 38 and said shaft are removed and a pair of adjusting-blocks 56 are inserted between the bars 29 and 34 for engaging the ridges 33 and 35, and are adapted to be adjusted vertically by a rotation of the screws 32, each block 56 providing bearings for one end of a horizontal wrist-pin 57 of an arm 58 of a yoke 59 as best shown in Fig. 2.

Numeral 60 indicates a pair of springs each having its lower end connected with a cultivator beam, its upper end being supported by the upper part of the yoke, which operates as an aid when lifting cultivators from the ground. Numeral 61 indicates a pair of connecting-blocks carried by the wrist-pins, to which the cultivator beams are attached by suitable keepers 62.

It will be seen that when used for cultivating corn or other crops arranged in rows, an operator while riding on the tractor may guide the cultivator-beams with his feet, as usual, or may conveniently grasp the handles 63 for guiding the cultivators, and may press them downwardly for a suitable engagement of the cultivator teeth with the ground, and when obstructions are encountered the springs 60 operate to advantage for lifting the cultivators.

When "turning about" at the ends of the rows, the cultivator beams may be swung upwardly and held in an elevated position, the loops or shafts 64 with which the beams are provided being caught upon the hooks 65 which project inwardly from the side-bars of the frame. Numeral 66 indicates wing-nuts for moving the bolts 67 vertically when it is desired to adjust the tension of the springs, the upper ends of the springs being connected with the lower ends of said bolts. A pulley is indicated at 68 this being rotated by the engine shaft by means not shown, and useful when the parts are employed as a stationary engine. Numeral 69 indicates a canopy or top supported by means of suitable standards 70.

It will be noted that the upper part of the yoke is disposed a considerable distance, comparatively, from the ground, so that it will not injure growing crops when they are cultivated. By rotating the shafts 32 the yoke may be elevated to a required height so that growing corn will not be injured, the clearance for this purpose on account of the proportion of parts provided, being about thirty-two inches, and also the yoke may be lowered in a required degree, the springs 60 being adjusted for this purpose by the means described.

Having fully described my invention, what I claim and desire to secure by Letters Patent is,—

1. In a tractor, a frame having substantially parallel side-bars, an engine-driven axle disposed transversely of the frame and provided with wheels a pair of side-sections traversed by the axle and disposed parallel with and inwardly of the side-bars each being provided with a vertical guide, a pair of L-shaped bars each being provided with a guide, means for removably connecting said L-shaped bars with the side-sections for maintaining their guides parallel with the guides of said sections, grooved bearing-members engaging said guides, and a pair of screws rotatable to adjust said grooved bearing-members for a connection with objects to be drawn.

2. In a tractor, a frame having substantially parallel side-bars, an engine-driven axle disposed transversely of and having bearings in the side-bars, a pair of traction wheels carried by the axle and disposed outwardly of the side-bars, a pair of cross bars secured to the side-bars at longitudinal intervals thereof, a pair of side-sections each having a horizontal part traversed by the axle and secured to the cross bar and having an upright part provided with a ridge, a pair of L-shaped bars each being provided with a ridge, means for removably connecting the L-shaped bars with the side-sections for maintaining their ridges parallel with the ridges of said sections, a pair of grooved members for a connection with objects to be drawn, and means to elevate or lower said grooved members with reference to the side sections.

3. In a tractor, a frame having substantially parallel side-bars, an engine-driven axle disposed transversely of the frame and provided with wheels, a pair of side-sections disposed parallel with and extending below the side-bars each being provided with a vertical guide, a pair of holder-bars each having a vertical part provided with a guide and disposed adjacent to the end of a section with its guide parallel with the guide thereof, a pair of grooved members for a connection with objects to be drawn, each grooved member being in engagement with a guide of a section and a guide of a holder-bar, means to adjust the grooved members longitudinally of the guides, each holder-bar being provided with a horizontal part for a rigid mounting on a section.

In testimony whereof, I have affixed my signature in presence of two witnesses.

HENRY OLERICH.

Witnesses:
 ARTHUR H. STURGES,
 HIRAM A. STURGES.